Nov. 21, 1967  P. J. ERNISSE ET AL  3,353,467
FLASH PHOTOGRAPHY
Filed May 24, 1965  4 Sheets-Sheet 2
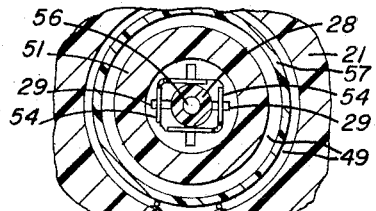
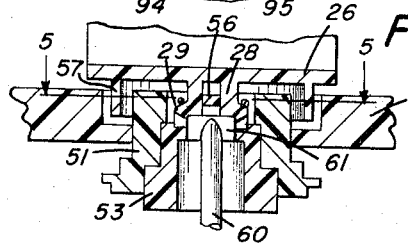
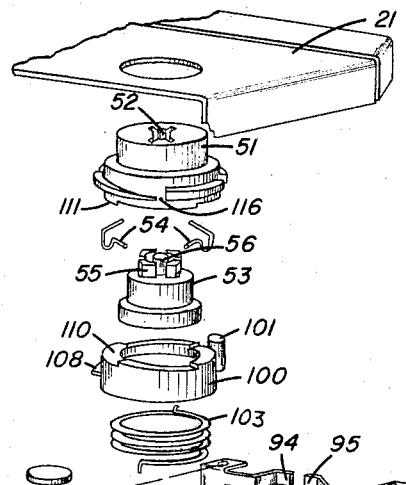
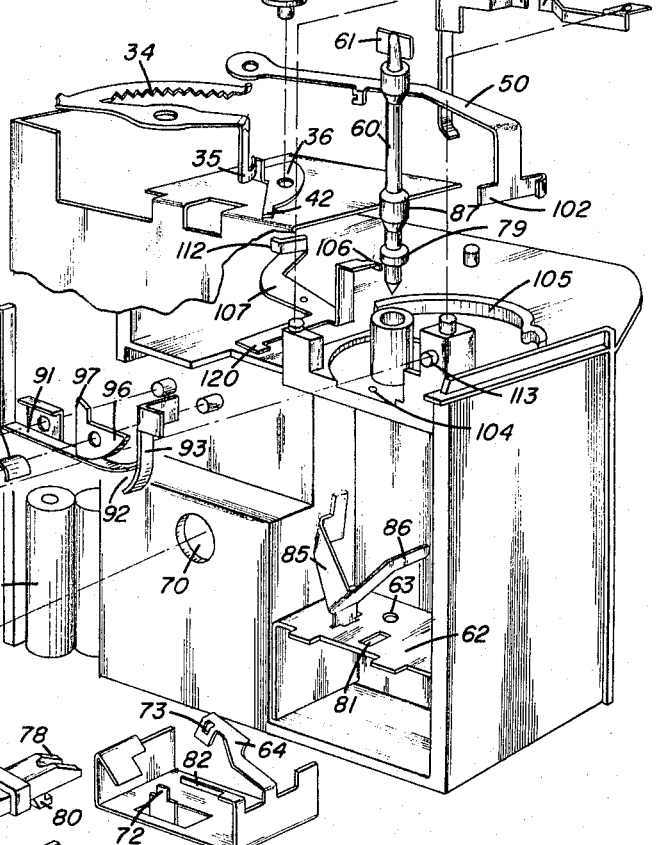
PAUL J. ERNISSE
MICHAEL S. MONTALTO
INVENTORS
BY
ATTORNEYS Nov. 21, 1967 P. J. ERNISSE ET AL 3,353,467
FLASH PHOTOGRAPHY
Filed May 24, 1965 4 Sheets-Sheet 3

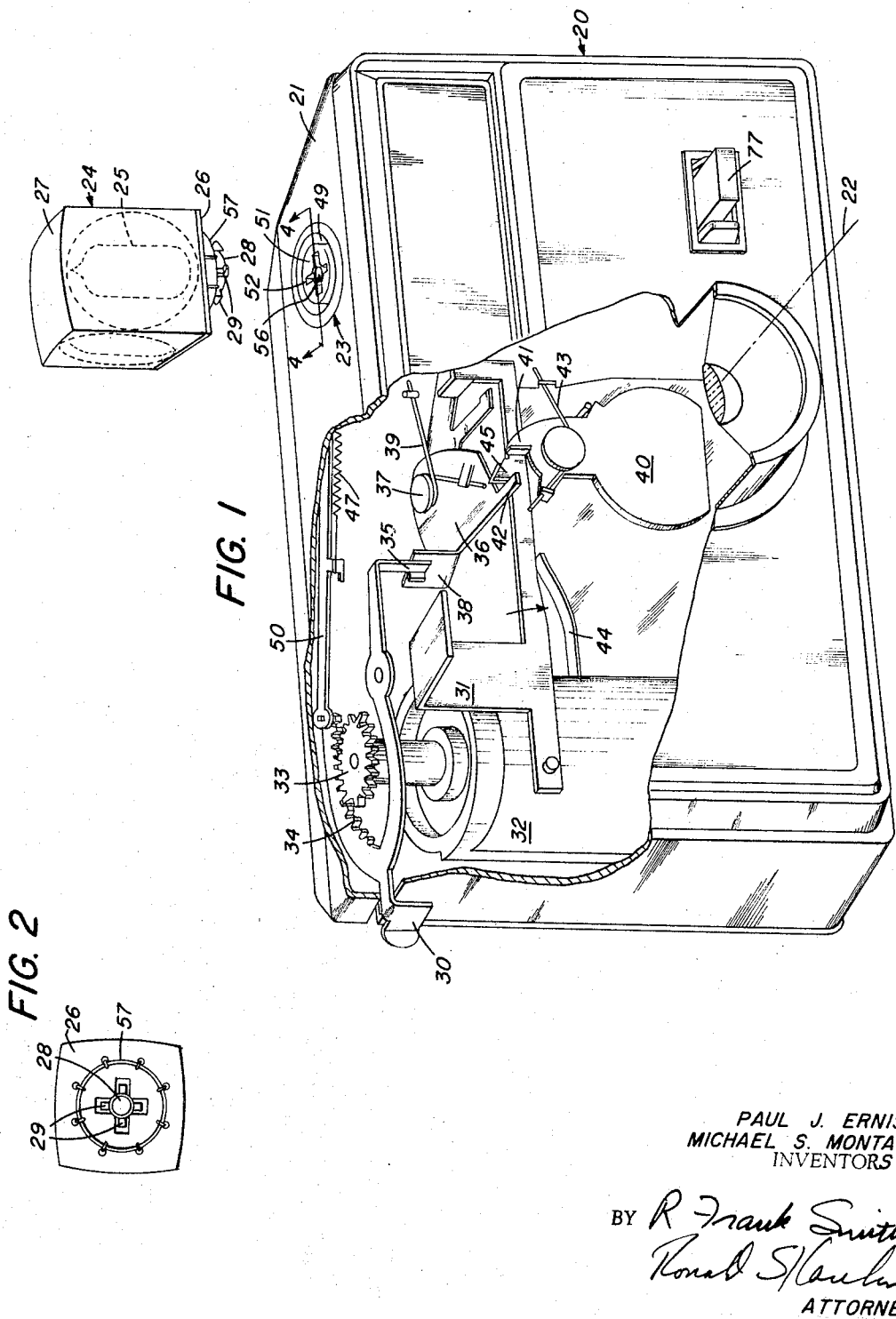

PAUL J. ERNISSE
MICHAEL S. MONTALTO
INVENTORS

BY R. Frank Smith
Ronald S. Hanken
ATTORNEYS

Nov. 21, 1967 P. J. ERNISSE ET AL 3,353,467
FLASH PHOTOGRAPHY
Filed May 24, 1965 4 Sheets-Sheet 4
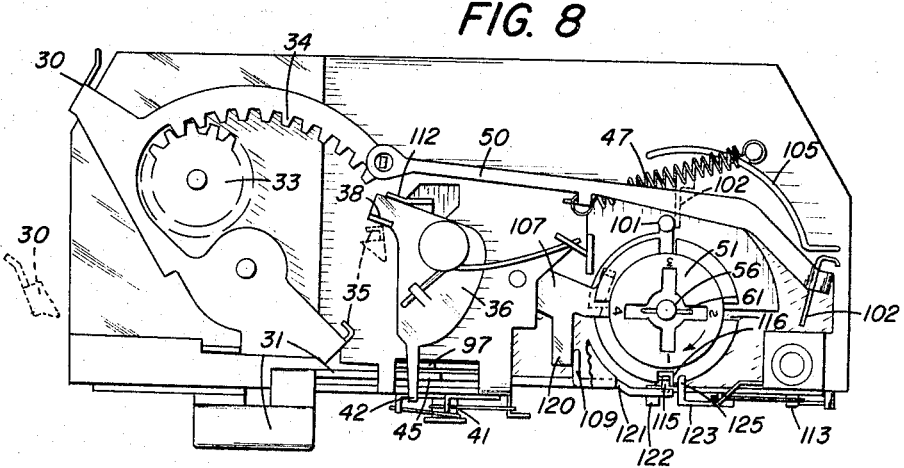
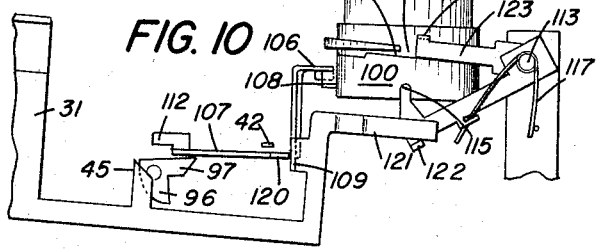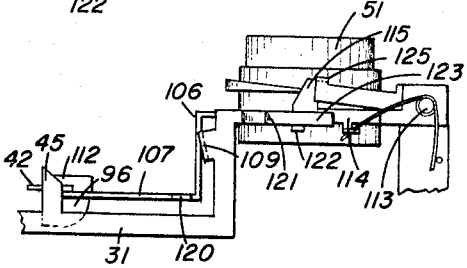
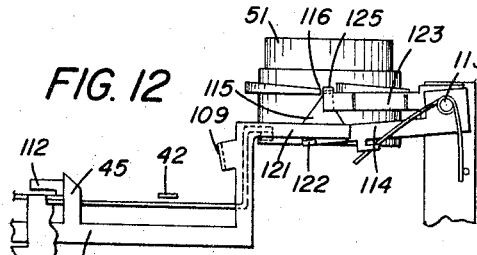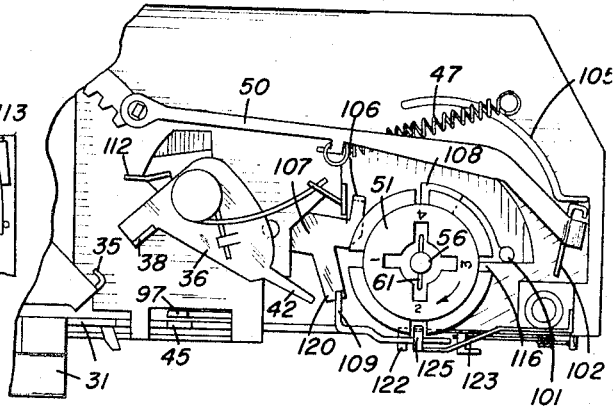
PAUL J. ERNISSE
MICHAEL S. MONTALTO
INVENTORS
BY R. Frank Smith
Ronald S. Kauh
ATTORNEYS

United States Patent Office 3,353,467
Patented Nov. 21, 1967

3,353,467
FLASH PHOTOGRAPHY
Paul J. Ernisse and Michael S. Montalto, Rochester, N.Y., assignors to Eastman Kodak Company, Rochester, N.Y., a corporation of New Jersey
Filed May 24, 1965, Ser. No. 458,015
25 Claims. (Cl. 95—11.5)

ABSTRACT OF THE DISCLOSURE

A photographic flash assembly for use with a camera having a settable operating mechanism, the assembly including a rotatable socket to receive a multilamp flash package, a drive mechanism energized with setting of the camera operating mechanism and released to rotate the socket after camera operation. Also shown is a control pin responsive to attachment of a package to adjust automatically the camera shutter mechanism and the exposure diaphragm mechanism, the pin further cooperating with an ejection button to eject a received package.

---

This invention relates to flash photography and more particularly, to photographic apparatus such as still cameras with built-in photoflash systems for accepting multilamp photoflash packages.

There has been developed a disposable multilamp photoflash unit or package having a plurality of photoflash lamps and disclosed, for example, in applications for United States letters patent, Ser. No. 417,914, now Patent No. 3,327,105, and Ser. No. 417,913, filed Dec. 14, 1964, in the name of Franklin D. Kottler et. al. and Dean M. Peterson et al., respectively. The present invention comprises means in a photographic still camera having a socket for accepting such a multilamp package and a mechanism for automatically indexing the package to successively place fresh or unfired lamps in the camera flash circuit with successive opertaions of the camera. As such, a camera according to the present invention includes means to adjust camera operation for flash upon insertion of a multilamp package into the receiving socket of the camera, and means for automatically indexing the package by rotation to place a fresh lamp in the flash circuit after the prior flash exposure has been taken.

An important object of the present invention resides, therefore, in the provision of a new and improved photographic still camera designed to accept and automatically index a multilamp photoflash package.

Yet another object resides in the provision of a new and improved socket arrangement in a camera for receiving a multilamp photoflash package, including means to adjust the camera for flash operation when a package is inserted and to permit selective ejection of the package whenever flash pictures are not desired.

Still another object of the present invention resides in the provision of a multilamp package and receiving socket drive mechanism which is energized during setting of an operating means, such as film wind and/or resetting of the shutter mechanism for a film exposure, the socket drive mechanism acting to index the multilamp package after the film exposure.

And another object resides in the provision of a receiving socket and a drive mechanism wherein a package may be inserted in one of a predetermined number of selected positions with the package remaining in the one position irrespective of whether the film has been wound and the shutter reset for the next operation of the camera.

Figure 6:
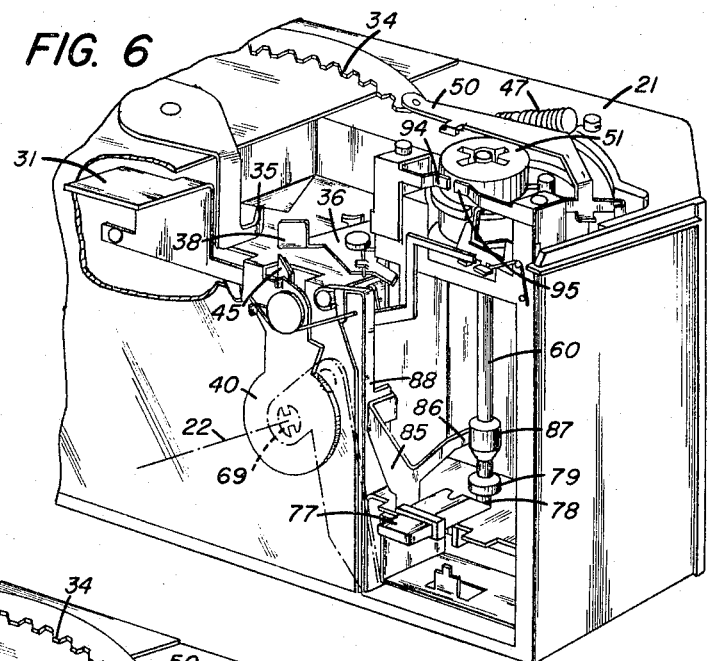
Figure 7:
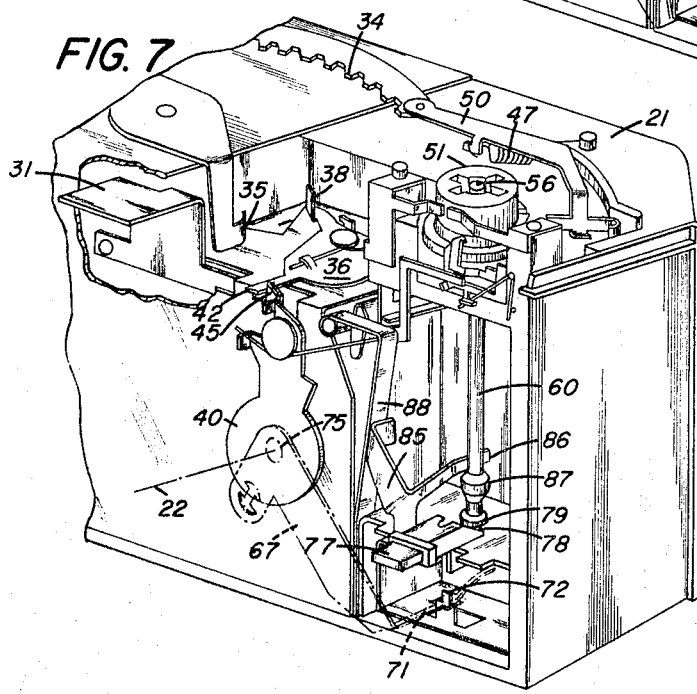

These and other objects and advantages will become more apparent in the course of the following description, the accompanying drawing forming a part thereof and wherein:

FIG. 1 is a partially broken perspective view of a photographic still camera embodying the present invention, together with a suitable multilamp photoflash package;
FIG. 2 is a bottom view of the multilamp package shown in FIG. 1.
FIG. 3 is an exploded view showing elements of the present invention together with associated camera elements;
FIG. 4 is a sectional view of the receiving socket, taken on line 4—4 of FIG. 1;
FIG. 5 is a section view taken on line 5—5 of FIG. 4;
FIG. 6 is a partial perspective view showing the elements of the preferred embodiment without a multilamp package inserted in the receiving socket;
FIG. 7 is a like partial perspective view showing the elements as they would appear with a multilamp package inserted, and
FIGS. 8 through 12 are plan and front views showing certain elements in various stages of camera operation.

With reference to FIG. 1, there is shown a photographic roll film still camera 20 comprising a light tight camera body 21 having a picture-taking or lens axis 22 on which are located the usual focusing lens and film plane for holding a frame of a roll of photosensitive film (not shown). The shutter mechanism and diaphragm, cooperating with the present invention and to be described in more detail, are also positioned to be in operative relationship with the axis 22.

Accessibly located at the top wall of the camera body 21 is a multilamp package receiving socket 23 designed to receive a disposable, multilamp photoflash unit or package 24. The package 24 is more fully described in the above listed U.S. applications. Briefly, however, the package 24 includes a plurality (four) of photoflash lamps 25 (AG-type) ordinately mounted in a vertical position about a vertical axis of rotation on a substantially square base 26, with the lamp lead-in wires extending below the base 26 as shown. Individual light reflective surfaces (reflectors) are positioned behind each lamp 25 and an overall light transmitting protective cover 27 is provided. The base 26 defines four lamp sides and includes a depending center post 28 of tubular shape with four engagement or retaining lugs 29, each extending radially outwardly toward a respective lamp side and having upper and lower ramped surfaces. The socket 23 defines an opening, corresponding to the shape of the post 28 and lugs 29 as shown, for receiving the package 24 in any one of four predetermined positions in which one of the lamps 25 faces forwardly, i.e., in the direction of the picture-taking axis 22.

Film wind and shutter mechanisms

To wind the roll film along the film plane for positioning successive frames of film on the film plane, there is provided an accessible film winding lever 30. The lever 30 also sets the camera shutter operating mechanism, which is released by an accessible body release member 31 to expose the positioned film frame by admitting light along the axis 22 for a predetermined period of time.

A film winding mechanism suitable for use with the present invention shown is disclosed in more detail in U.S. Patent No. 3,106,142. Here, the mechanism is shown to include a film take-up reel 32 rotatable in a counter-clockwise direction (looking down) through a suitable clutch arrangement by means of a pinion gear drive 33 cooperating with a arcuate rack arm 34 on the winding lever 30. The winding lever 30 also includes a shutter cocking foot 35 which acts to set the shutter mechanism as the film is being wound.

A suitable shutter mechanism comprises a shutter striking plate or driver 36 which rotates about a pivot pin 37. An upstanding lug 38 on the striking plate 36 is engaged by cocking foot 35 whenever the winding lever is operated to move the plate 36 clockwise (looking down) against the bias of a strong spring 39. The shutter itself comprises a pivotable impact shutter blade 40 having an ear 41 in the path of a finger 42 on the striking plate 36. A lighter spring 43 normally holds the blade 40 in a position covering the exposure aperture, and a latch 45 on the body release 31 is normally in the path of movement of finger 42 to prevent shutter operation until the body release is depressed. Upon release of the cocked striking plate by depressing the body release 31 to pivot in the direction of the arrow (FIG. 1) against retaining spring 44 as shown, the action of spring 39 causes the finger 42 to move to the right (FIG. 1), striking ear 41 and moving the shutter blade 40 off the exposure aperture against the bias of spring 43 for a predetermined period of time, the shutter blade 40 returning to cover the aperture by operation of the spring 43.

To return the winding lever 30 to its initial position after each winding stroke or when released, there is provided a return tension spring 47 which is fixed to the camera body 21 at one end and attached at its other end to a slidable socket winding arm 50. The socket winding arm 50, which interconnects lever 30 and the indexing mechanism to be described, is pivotally attached to the winding lever 30 by a pin and socket arrangement.

*Lamp socket and camera adjustment assembly*

Referring now to FIG. 3, the unit receiving socket 23 comprises a hollow socket cover 51 defining the upper access opening 52 for receiving the package base 26. Fixed to the cover is a socket base 53 having two V-shaped retaining springs 54 mounted at opposing corners about appropriate ribbing 55 on the base 53. A center stabilizing spindle 56 within the ribbing space is positioned to be insertable into the center post 28 of a multilamp package. When the post 28 of a package is inserted into the socket opening 52, the retainining springs 54 each engage adjacent retaining lugs 29 on the upper ramped surfaces to releasably retain the package in the socket. During the insertion, the ends of the springs 54 are urged outwardly by the lower ramped surfaces until the package is fully seated, and the spring ends then return to engage the upper ramped surfaces.

The socket cover 51 and camera body 21 define an annular groove 49 which receives the contact ring 57 of the inserted package 24.

A vertically slidable control pin 60, mounted axially below the socket base 53, includes a wing top 61 which extends into the base 53 and is exposed through slots in the center stabilizing spindle 56. The upper surface of the wing 61 is engageable by the inserted center post 28. The socket base 53 defines an upper bearing surface for the control pin 60, and a bracket 62, which includes a bore hole 63 for receiving the lower portion of pin 60, defines a lower bearing surface. Both bearing surfaces and the slots permit vertical sliding and rotation of pin 60.

Engageable with the lower end of pin 60 is a plate spring 64 which urges the pin 60 upwardly for engagement with a center post 28. However, spring 64 is weaker than retaining springs 54 so that the spring 64 does not automatically release an inserted unit from the retaining springs.

Controlled by insertion of the unit is an aperature diaphragm vane 67 which is pivotable about a pin 68. The vane 67 includes an integral spring acting against a stop (not shown) to urge the vane in a position with the daylight aperture 69 covering the lens opening 70 (FIGS. 3 and 6). A separate control arm 71, pivoted on post 72, has one end engaging vane 67 and the other end inserted into a slot 73 on the spring 64. As can be seen, downward movement of pin 60 causes the spring 64 to move downward and pivot the vane to place flash aperture 75 of the vane on the axis (FIG. 7).

In order to eject an inserted package from the receiving socket, there is provided an accessible ejector button 77 having a ramp surface 78 cooperating with a collar 79 on pin 60. The button 77 slides along bracket 62 by a lug 80 in a slot 81 in the bracket, and a spring 82 acts on the inner edge of lug 80 to urge the button 77 outwardly. Pressing the button 77 manually against the bias of spring 82 causes the pin 60 to be moved upwardly by engagement of ramp 78 with collar 79, thereby causing the wing top 61 to push the inserted package out of the socket.

According to this embodiment, the shutter mechanism decsribed above may also be adjusted for either flash operation or daylight operation, depending upon the presence of a package in the receiving socket. As shown here, there is provided a bell spring lever 85 pivoted in the bracket 62 and having one end 86 biased toward and engageable with a step portion 87 on the control pin 60. The other end of the lever 85 engages an inertia stop 88 which is selectively movable into the path of movement of ear 41 of shutter blade 40 to arrest movement of the shutter blade after actuation and thereby shorten the opening time of the shutter. A related mechanism is shown in U.S. Patent No. 3,319,548.

Referring to FIGS. 6 and 7, the engagement end 86 engages the step portion 87 when no package is inserted and the control pin is in its uppermost position, thereby limiting shutter speed to a speed suitable for daylight operation, say 1/80 sec. When a package is inserted into the socket and the control pin 60 is caused to move down, the step portion moves out of the path of end 86 and the bell lever 85 is moved by its bias to the right (FIG. 3) to move the stop 88 out of the shutter blade path, thereby enabling it to operate at a slower speed suitable for flash operation, say 1/40 sec. FIG. 6 shows these elements as they appear without an inserted package, and FIG. 7 shows these elements with a package inserted, although for clarity the package has not been shown in FIG. 7.

*Flash operation*

To provide for flash pictures, a lamp firing circuit is built into the camera body. The circuit comprises a suitable source of electric potential such as batteries 90, one terminal of which is connected to camera ground and the other terminal of which is connected to a resilient contact arm 91 forming part of a flash synchronizing switch 92. The contact arm is operatively engageable with a fixed contact 93, which in turn is electrically connected to an exposed lamp terminal 94. Lamp terminal 94 physically engages one lead-in wire of the forward-facing lamp 25 of an inserted package 24, whereas the other lead-in wire is engaged by a second lamp terminal 95 connected to camera ground to complete the circuit. The terminals 94, 95 are positioned in the annular groove 49 as shown in FIG. 5.

Flash is synchronized with camera exposure by a pivoted control cam 96 having a control end 97 normally in the path of movement of finger 42 by the bias of a spring 98. When the body release 31 is depressed, the movement of the striking plate 36 causes the cam to rotate clockwise (FIG. 3) until contact arm 91 engages contact 93 to complete the lamp firing circuit. Operation of the flash synchronizing circuit is more fully described in U.S. Patent No. 3,318,217.

*Socket and lamp package indexing mechanism*

According to the invention, the package-receiving socket 23 (and inserted multiplamp package 24) is automatically indexed or repositioned to present a fresh lamp in the electrical firing circuit after an exposure has been made. In the embodiment shown, a spring drive mechanism is provided to achieve this result. The drive spring mechanism is energized as film is wound and the shutter cocked or set, and after exposure, the drive mechanism acts automatically to rotate the socket 23 ninety degrees to place a subsequent lamp in the lamp circuit.

As a part of the spring drive mechanism, a rotatable socket driving ring 100 is positioned below the package socket 23. Ring 100 includes a fixed vertical winding pin 101 which is engageable by the hook end 102 of the socket winding arm 50.

A helical drive spring 103, fixed at one end to the ring 100 and at the other end to the camera body at hole 104, urges the ring in a clockwise direction (looking down). Referring to FIG. 8, as the winding lever 30 is operated by moving it from the position shown in solid to the position shown in dotted lines, hook end 102 engages pin 100 and is guided by guide edge 105 to rotate the ring 100 from an original position shown in FIG. 11 one-quarter turn in a counterclockwise direction (looking down) to the position shown in FIG. 8. Upon completion of the 90° rotation, a latch tab 106 on a lever 107, rotatable coaxially with the striking plate 36, engages a wedge shaped latch shirt 108 on the periphery of ring 100. This rotation is against the bias of the helical drive spring 103, and the spring 103 thus tends to rotate the ring 100 in the clockwise direction.

At the top surface of the driving ring 100 are defined a plurality (four) of clutch teeth 110 engageable with corresponding teeth 111 on the bottom surface of the socket cover 51. The cooperating teeth 110, 111 operate to rotate the socket assembly 23 clockwise with ring 100 by the spring 103, whereas ring 100 is permitted to be rotated counterclockwise by winding arm 50 without simultaneous rotation of the socket. When the ring 100 has been rotated counterclockwise by arm 50 to its energized position with tab 106 engaging shirt 108, a stop plate 112 on the lever 107 is engaged by the striking plate 36 to maintain tab 106 stationary and prevent return rotation of the ring 100 until after camera operation as described.

To ensure proper positioning of the socket assembly 23 during indexing, there is provided a socket indexing lever 114 (pivotable about pin 113) having an indexing tab 115 insertable into a selected one of four notches 116 equally spaced on the periphery of the socket base 53. A wire spring 117 urges the lever 114 into a notch 116 by engagement with a spring ear 118 on the lever 114 whenever the driving ring 100 and socket assembly are rotated by the spring 103 to position a subsequent lamp 25 in the flash circuit.

As stated, shutter operation is controlled by a release latch 45 on the body release member 31. Although the striking plate 36 then moves to otherwise permit lever 107 to rotate by urging of the drive spring 103 and permit socket indexing, a tab 120 on the lever 107 engages a stop 109 on the body release member 31 to prevent rotation of lever 107 when body release member is fully depressed. As the body release member 31 is being depressed, an actuating extension 121 on the body release member acts as a disabling means by engaging ear 122 on the indexing lever 114 to pivot the lever down against the bias of spring 117 and thereby move tab 115 out of engagement with the forward notch 116.

There is also provided a separate stop arm 123 which is pivotable coaxially with the indexing lever 114 on pivot pin 113. Arm 123, however, defines an elongated slot 124 which also enables the arm to slide laterally. Arm 123 also includes a stop end 125 engageable with the notches 116, and a spring 126 is provided to bias the arm 123 to the right as seen from the front.

As can be seen, the upper edge trailing each notch 116 is tapered to permit stop end 125 of arm 123, by action of spring 126, to drop into the next succeeding notch 116 as the socket assembly 23 is being indexed and slide with the assembly until the edge of slot 124 engages pin 113. Thus, arm 123 ensures that rotation or indexing of the socket assembly 23 will be terminated when the next succeeding lamp position is located at the circuit terminals.

*Camera operation*

To operate the photographic camera according to the preferred embodiment with photoflash from a multilamp package, the base 26 of a multilamp flash unit 24 is placed in the socket assembly 23 with a fresh photoflash lamp facing in the direction of the picture-taking axis 22 and the lead-in wires of the lamp engaging the exposed flash circuit terminals 94, 95. This position is indicated by the numeral 1 in FIG. 8. As the unit base 26 is inserted, the control pin 60 is moved downwardly to automatically adjust the diaphragm aperture and the shutter speed for flash operation in the manner described.

If a fresh frame of the film is not at the plane on the lens axis 22, the film is advanced by turning the film advance lever 30 to the position shown in dotted lines in FIG. 8, thereby moving an unexposed film frame onto the film plane and setting the shutter by cocking the shutter striking plate 36 through cocking foot 35 on the film advance lever 30. Simultaneously, the socket driving ring 100 is rotated 90° counterclockwise (FIG. 9) to the position shown in FIG. 9 against the bias of the helical drive spring 103, where the ring 100 is held in position by engagement of tab 106 with the wedge shaped shirt 108. During the rotation of the ring 100, the indexing lever, which is in the forward notch 116 of the socket assembly 23, prevents the socket assembly 23 and inserted package from rotating with ring 100 in this direction during winding. When the winding is thus completed, the driving ring 100 tends to rotate clockwise (FIG. 8) but is held in position by the rotatable latch lever 107, the latch lever in turn being prevented from moving to release the ring 100 because of the engagement of the stop plate 112 with the striking plate 36.

At this point, the winding lever 30 is permitted to return to its initial position by return spring 47, as shown in solid lines in FIG. 8, and the camera is ready for operation with augmenting flash.

This is accomplished by aiming the camera in the desired direction and depressing the body release member 30 in the direction of the arrow shown in FIG. 1 to its fully depressed position (FIG. 10). This motion initially releases the finger 42 of the cocked striking plate 36, which rapidly strikes the shutter ear 45 to cause the shutter blade 40 to uncap the diaphragm aperture according to the predetermined time. Simultaneously, finger 42 also strikes the circuit switch cam ear 97 to complete the flash circuit and fire the lamp 25 in the circuit in timed relationship with the uncapping of the exposure aperture to take the "flash picture."

As the body release member 30 is being depressed, extension 121 engaging ear 122 of the indexing lever 114 moves the indexing lever 114 down to clear tab 115 from the forward notch 116 of the socket assembly 23. While the release member 30 is fully depressed and the striking plate 36 has moved from its cocked position the latch lever 107 (and driving ring 100) tends to be rotated by spring 103 but is maintained in its holding position by the stop surface 109 engaging the tab 120 on the latch lever 107.

After the "flash picture" has been taken and the body release member 30 is released by the operator to return to its original position by spring 44, the stop surface 109 is moved out of the path of the latch lever tab 120, thereby releasing latch lever 107 and permitting the driving ring 100 and socket assembly 23 to be rotated in the clockwise direction as shown by the arrow (FIGS. 8 and 12). As the socket assembly 23 (and inserted package) is rotating to move the position numbered 2 into the flash circuit position, the next succeeding notch 116 is engaged by the stop end 125 of arm 123, which is at far right position as shown in FIG. 10. Continuing the rotation to the full 90°, the arm 123 slides to the left with the rotating socket assembly 23 to the position shown in FIGS. 11 and 12. The stop arm 123 then prevents further rotation of the socket assembly 23. When the body release member is in its up position and the socket assembly fully indexed, spring 117 moves the indexing lever tab 115 into the forward notch 116, and tab 115 lifts stop end 125 out of the notch 116. Simultaneously, spring 126 (FIG. 3) causes the stop arm 123 to be moved back to the right to engage the next succeeding notch after the subsequent camera operation. This mechanism ensures that the socket assembly will always stop after a 90° rotation, or single index position, regardless of the rate at which the camera operator permits the body release member 30 to be returned to its original position. Similarly, the socket assembly maintains its preset position prior to exposure, whether or not the film has been wound and the operating mechanism cocked.

At this time, a fresh flash lamp 25 from the multilamp package is in the circuit (as shown by numeral 2 in FIG. 11), and another flash picture may be taken after film wind and cocking in the manner described. After all four lamps in the inserted package have been used, or whenever daylight operation of the camera is desired, the ejector button 77 is depressed to push the package 24 out of the socket assembly 23 and reset the diaphragm and shutter mechanism for daylight operation.

While the invention has been described by reference to a preferred embodiment showing an integrated camera mechanism, it is obvious that various modifications and charges in form can be resorted to without departing from the spirit of the invention or the scope of the subjoined claims.

We claim:
1. For use in flash photography with a camera having a release member movable from a first position to a second position to make an exposure the combination comprising:
    rotatable socket means to detachably receive a unitary package containing a plurality of photoflash lamps with individual reflectors,
    fixed terminal means to place a selected one of the lamps in a photoflash circuit to light the said one lamp in timed relation with operation of a camera,
    means operable to selectively rotate the socket automatically to place successive others of the lamp in the photoflash circuit, and
    an indexing mechanism interconnecting the release member and the automatic rotating means to operate the automatic rotating means only in response to return of the release member to its first position after exposure.

2. The combination according to claim 1 wherein the indexing mechanism comprises an extension of the release member.

3. The combination according to claim 1 wherein the indexing mechanism comprises latch means engaging the automatic rotating means, the latch means being responsive to movement of the release member.

4. For use in flash photography the combination comprising:
    rotatable socket means to detachably receive a unitary package containing a plurality of photoflash lamps with individual reflectors, the socket means being rotatable about an axis in a predetermined direction;
    fixed terminal means to connect a selected one of the lamps to a photoflash circuit to light the said one lamp in timed relation with operation of a camera;
    means to selectively rotate the socket automatically to connect successive others of the lamps to the photoflash circuit;
    the rotating means comprising a drive member rotatable about said axis, spring means biasing the drive member in the predetermined direction, winding means overcoming the spring means to rotate the drive mechanism in the opposite direction and relative to the socket means to an energized position, and means operatively connecting the drive member and socket means for rotation in the predetermined direction from the energized position by the bias of the spring means; and
    means to prevent socket rotation until after camera operation.

5. The combination according to claim 4 wherein the drive member includes a latch element, and the preventing means includes a latch arm engaging the latch element to releasably hold the drive member in the energized position until after camera operation.

6. The combination according to claim 4 wherein the socket means includes a base portion having a plurality of indexing notches, and the preventing means includes an indexing arm engageable with a selected one of the notches to retain the socket means in a position with a selected one lamp in the circuit.

7. The combination according to claim 6 and further comprising mechanical means operatively connected to the indexing arm to disengage the indexing arm from the selected one notch during camera operation.

8. For use with a photographic camera having an operating mechanism with means to set the mechanism for operation of the camera, the combination comprising:
    a rotatable socket to detachably receive a unitary package containing a plurality of photoflash lamps,
    a photoflash circuit with terminal means to place a selected one lamp in the circuit and flash the lamp in timed relation with camera operation,
    drive means to rotate the socket and received package to place successive others of the lamps in the circuit,
    means interconnected to the setting means to energize the drive means during the setting of the operating mechanism, and
    latching means to operatively hold the drive means energized while the operating mechanism is set, the latch means being responsive to camera,
    operation to permit the energized drive means to rotate the socket and place a successive one other lamp in the circuit.

9. The camera according to claim 8 wherein the socket is rotatable in a predetermined direction, the drive means includes a drive member biased in the said direction, and the energizing means comprises a winding arm operatively engaging the drive member to move the drive member against the bias and relative to the socket in an opposite direction.

10. The camera according to claim 9 wherein the drive member comprises a ring rotatable coaxially with said socket, the ring defining a winding pin engageable by the winding arm and a latch tab engageable by the latching means.

11. The camera according to claim 8 and further comprising indexing means operatively controlling the socket to retain the socket in a selected one of a plurality of predetermined positions corresponding to the placing of the lamps in the circuit.

12. The camera according to claim 11 and further comprising means operative during camera operation to disable the indexing means and permit socket rotation.

13. The camera according to claim 11 and further comprising stop means to terminate socket rotation when the next succeeding socket position reaches the indexing means.

14. A photographic camera comprising:
    operating means to make an exposure,
    means to reset the operating means after each exposure,
    a rotatable socket to detachably receive a unitary package containing a plurality of photoflash lamps,
    a photoflash circuit with fixed terminal means to place a selected one lamp in the circuit and flash the lamp in timed relation with the operating means,
    drive means to rotate the socket and received package to place successive others of the lamps in the circuit,
    means interconnected to the resetting means to energize the drive means during the resetting of the operating mechanism, latching means to operatively hold the drive means energized after the operating mechanism is reset, and means responsive to the operating means to permit the drive means after exposure making to rotate the socket and place a successive one other lamp in the circuit.

15. The camera according to claim 14 wherein the operating means includes a shutter operating member having a reset position, and the latching means comprises an arm operatively engaged by the shutter operating member in the reset position.

16. The camera according to claim 15 wherein the operating means includes a body release member movable to a camera operating position to actuate the operating means, and the maintaining means comprises a latch tab on the body release member engaging the latching means to maintain the latching means while the body release member is in its operating position.

17. The camera according to claim 14 and further comprising indexing means operatively controlling the socket to retain the socket in a selected one of a plurality of predetermined positions corresponding to the placing of the lamps in the circuit.

18. The camera according to claim 17 and further comprising stop means to terminate socket rotation when the next succeeding socket position reaches the indexing means.

19. The camera according to claim 17 and further comprising means operative during camera operation to disable the indexing means and permit socket rotation.

20. The camera according to claim 19 wherein the operating means includes a movable body release arm, and the disabling means comprises an extension of the body release arm.

21. The camera according to claim 14 wherein the socket is rotatable in a predetermined direction, the drive means includes a drive member biased in the said direction, and the energizing means comprises a winding arm operatively engaging the drive member to move the drive member against the bias and relative to the socket in an opposite direction.

22. The camera according to claim 21 wherein the drive member comprises a ring rotatable coaxially with said socket, the ring defining a winding pin engageable by the winding arm and a latch tab engageable by the latching means.

23. The camera according to claim 22 wherein the resetting means includes a film winding and shutter setting lever, and the interconnecting means comprises an arm operatively connected at one end to the lever and engageable with the winding pin at the other end.

24. For flash photography, a camera comprising:

rotatable socket means to receive a unitary package containing a plurality of photoflash lamps and individual reflectors, the socket means including base means to enable rotation of a package with rotation of the socket means to place the lamps successively in a photoflash circuit, operating means to make an exposure including a shutter mechanism and an exposure diaphragm mechanism, and means to adjust the operating means for flash operation when a package is received in the socket means, the adjusting means including a slidable control pin adjusting both the shutter mechanism and the exposure diaphragm mechanism, the control pin being biased toward the socket means in a daylight position to adjust the mechanisms for daylight exposure and the control pin being engaged by a received package to move the control pin to a flash position adjusting the mechanisms for flash exposure.

25. A camera according to claim 24 wherein the slidable control pin is biased toward the socket means and has a portion engageable by a received package, the control pin being moved against the bias upon engagement by a package, and further comprising an accessible ejection button having an ejecting cam surface operatively engaging the control pin to move the pin toward its biased position and eject a received package.

References Cited

UNITED STATES PATENTS

| 2,804,537 | 8/1957 | Greger | 240—1.3 |
| 3,051,066 | 8/1962 | Lareau et al. | 95—11.5 |
| 3,087,318 | 4/1963 | Oswold. | |
| 3,096,025 | 7/1963 | Prochnow | 240—37 XR |
| 3,204,541 | 9/1965 | Frost et al. | 95—11.5 XR |
| 3,244,087 | 4/1966 | Anderson et al. | 95—11 |
| 3,263,068 | 7/1966 | Jakob | 240—1.3 |

FOREIGN PATENTS 1,110,009   6/1961   Germany.

NORTON ANSHER, *Primary Examiner.*

F. L. BRAUN, *Assistant Examiner.*